(12) United States Patent
Nafziger et al.

(10) Patent No.: US 8,966,871 B2
(45) Date of Patent: Mar. 3, 2015

(54) AUTOMATIC ROLL-BACK AND RETURN-TO-POSITION FOR HEADER TILT ON AN AGRICULTURAL MACHINE

(71) Applicant: AGCO Corporation, Duluth, GA (US)

(72) Inventors: Brendon Nafziger, Canton, KS (US);
Stanley R. Clark, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 109 days.

(21) Appl. No.: 13/727,658

(22) Filed: Dec. 27, 2012

(65) Prior Publication Data

US 2013/0283745 A1 Oct. 31, 2013

Related U.S. Application Data

(60) Provisional application No. 61/580,779, filed on Dec. 28, 2011.

(51) Int. Cl.
| | | |
|---|---|---|
| A01D 41/14 | (2006.01) | |
| A01D 41/127 | (2006.01) | |
| A01D 41/08 | (2006.01) | |
| A01D 43/06 | (2006.01) | |
| A01D 43/10 | (2006.01) | |

(52) U.S. Cl.
CPC ............. *A01D 43/06* (2013.01); *A01D 41/141* (2013.01); *A01D 43/107* (2013.01)
USPC .................................. 56/10.2 R; 56/10.2 A

(58) Field of Classification Search
CPC . A01D 41/141; A01D 43/06; A01D 434/008; A01D 41/145; A01D 34/006; A01D 75/287; A01B 63/002
USPC ......... 56/10.2 R, 10.2 A, 10.2 E, 208; 701/50
See application file for complete search history.

(56) References Cited

U.S. PATENT DOCUMENTS

| | | | | |
|---|---|---|---|---|
| 4,473,993 | A * | 10/1984 | Jennings et al. ................. | 56/208 |
| 4,733,523 | A * | 3/1988 | Dedeyne et al. ................ | 56/209 |
| 4,972,664 | A * | 11/1990 | Frey ................................ | 56/13.6 |
| 5,359,836 | A * | 11/1994 | Zeuner et al. ............. | 56/10.2 E |
| 5,621,643 | A * | 4/1997 | Nakagami et al. ............. | 701/50 |
| 5,694,317 | A * | 12/1997 | Nakagami et al. ............. | 701/50 |
| 5,819,190 | A * | 10/1998 | Nakagami et al. ............. | 701/50 |
| 5,984,018 | A * | 11/1999 | Yamamoto et al. ................ | 172/2 |
| 6,826,894 | B2 * | 12/2004 | Thiemann et al. ......... | 56/10.2 E |
| 7,603,837 | B2 * | 10/2009 | Ehrhart et al. ............. | 56/10.2 E |
| 2005/0216105 | A1 * | 9/2005 | Tabor .............................. | 700/63 |
| 2007/0068129 | A1 * | 3/2007 | Strosser ..................... | 56/10.2 E |
| 2009/0069987 | A1 * | 3/2009 | Omelchenko et al. .......... | 701/50 |
| 2009/0182471 | A1 * | 7/2009 | Bucher et al. .................... | 701/50 |
| 2013/0298515 | A1 * | 11/2013 | Lohrentz et al. .................. | 56/51 |
| 2014/0041352 | A1 * | 2/2014 | Johnson ..................... | 56/10.2 R |

* cited by examiner

*Primary Examiner* — Árpád Fábián-Kovács

(57) ABSTRACT

A windrower with a harvesting header with a crop cutting assembly for severing crop from the ground windrower has a header pitch sensor for measuring a fore/aft pitch angle and a hydraulic system. The hydraulic system moves the header between an operating height and a raised position, and also controls a fore/aft pitch angle. An electronics control module provides an output to activate solenoid valves in the hydraulic system to move the header between the operating height and the raised position and to select a desired pitch angle. When the header moves from the operating height to the raised position, the electronics control module operates the header hydraulic system to move the header to the zero-tilt condition, and upon lowering the header back the operating height, the electronics control module automatically returns the header to the selected pitch angle it was in at the start of the cycle.

4 Claims, 3 Drawing Sheets

AUTOMATIC ROLL-BACK AND RETURN-TO-POSITION FOR HEADER TILT ON AN AGRICULTURAL MACHINE

CROSS REFERENCE TO RELATED APPLICATIONS

This application claims priority to U.S. Provisional Application No. 61/580,779 filed Dec. 28, 2011, entitled "AUTOMATIC ROLL-BACK AND RETURN-TO-POSITION FOR HEADER TILT ON AN AGRICULTURAL MACHINE".

BACKGROUND OF THE INVENTION

1. Field of Invention

This invention relates to agricultural machines having crop harvesting headers, and more particularly to agricultural machines having a mode of operation that automatically adjusts the pitch angle of the header during manipulation of the header height.

2. Description of Related Art

Harvesting machines are commonly used to sever standing crops in the field and deposit the crop back onto the ground in the form of a windrow or swath to sever. A header at the front of the windrower cuts the ripened crop from the field. The crop is transported to the rear of the header and forming shields form a windrow of the crop between the tires of the machine for natural dry down of the crop. A subsequent field operation picks up the windrows for further processing, such as separating and cleaning in the case of grain crops, or baling or chopping in the case of hay.

Platform headers and draper headers are header types commonly used when harvesting crops such as small grains, peas, lentils, and rice. For example, U.S. Pat. No. 6,158,201 to Pruitt et al. entitled "Rotary Mower Conditioner Having Improved Crop Flow" discloses an exemplary header. When operating the header, it is desirable to have the ability to adjust the height at which the crops are cut off and also to sense and change the vertical position of the header to follow changing terrain. To accomplish this, it is known to use a header float system or a terrain following system to enable the header to follow the ground over changing terrain without gouging or digging into the soil. It would also be desirable to adjust the fore/aft pitch of the header to select the angle of the cutter bar to optimize crop cutting and feeding into the windrower. Based on the foregoing, it would be desirable to have a header control system that accommodates both cutting height and tilt on the header.

SUMMARY OF THE INVENTION

In one aspect, the invention is directed to a windrower with a harvesting header operable to cut and collect standing crop in the field mounted on a forward end of the windrower. The header has a laterally extending crop cutting assembly for severing crop from the ground as the windrower moves across a field. The windrower has a header pitch sensor for measuring a fore/aft pitch angle of the header and a header hydraulic system. The hydraulic system is used to move the header between an operating height in which the cutting assembly is configured to cut crop and a raised position, and also to control a fore/aft pitch angle of the header relative the windrower to move the angle of the cutting assembly between a zero-tilt condition and a desired pitch angle relative to the ground. The windrower also has an electronics control module providing an output to activate solenoid valves that cause hydraulic fluid to be ported through the header hydraulic system. The electrons control module is used to move the header between the operating height and the raised position and to select a desired pitch angle of the header by activating the solenoid valves to provide hydraulic flow to operate the header hydraulic system. When the electronics control module operates the header hydraulic system to move the header from the operating height to the raised position, the electronics control module operates the header hydraulic system to move the header to the zero-tilt condition, and upon lowering the header back the operating height, the electronics control module automatically returns the header to the selected pitch angle it was in at the start of the cycle as measured by the header pitch sensor.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
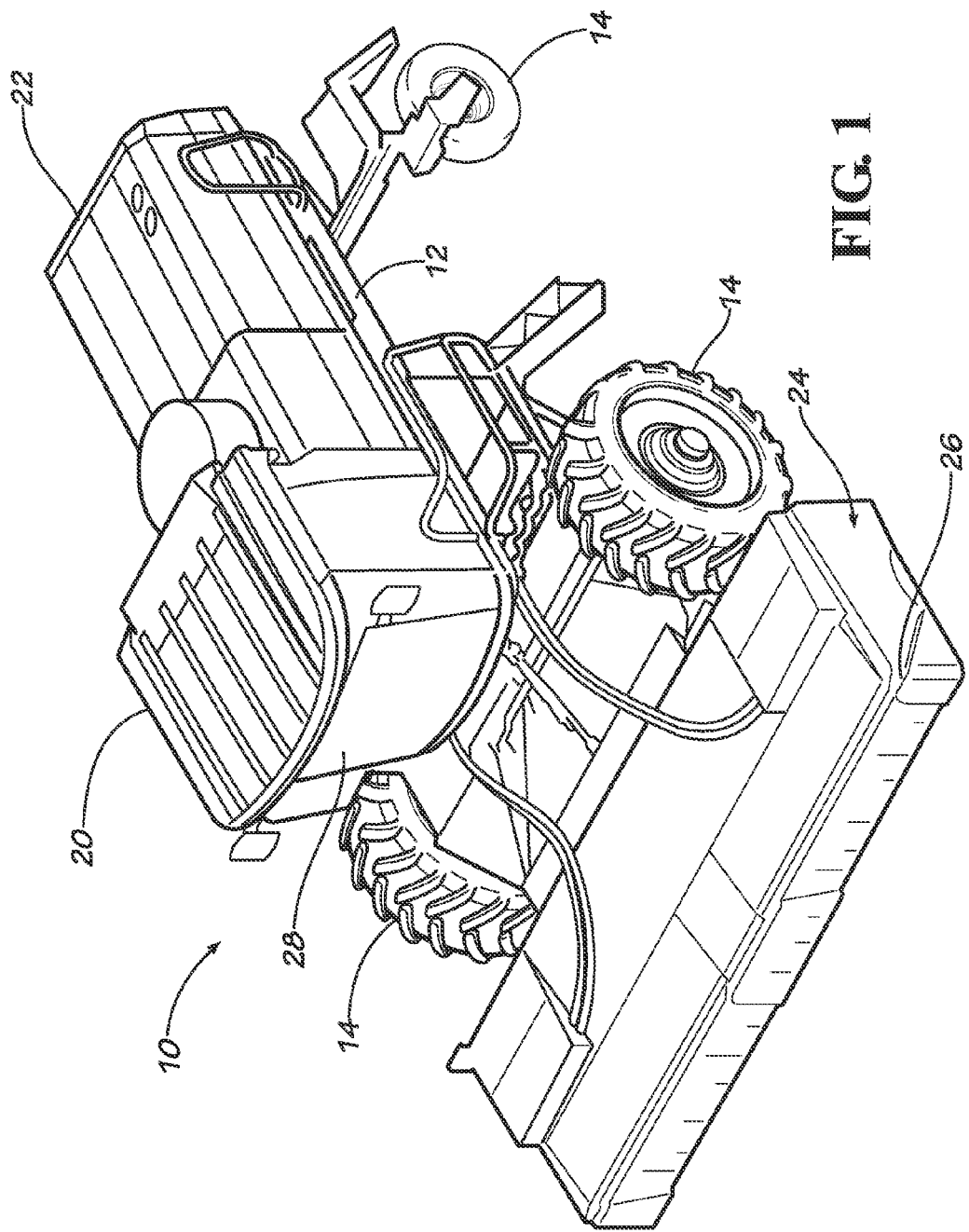
FIG. 1 shows a schematic view of an example embodiment of a self-propelled agricultural windrower in accordance with the invention.

FIG. 1 shows a harvester in the form of a self-propelled windrower 10 operable to mow and collect standing crop in the field, condition the cut material as it moves through the machine to improve its drying characteristics, and then return the conditioned material to the field in a windrow or swath. Although the invention will be described using a self-propelled windrower, one skilled in the art will understand that any self-propelled or pull-type rotary mower or combine may utilize the invention disclosed herein. The windrower 10 may include a chassis or frame 12 supported by wheels 14 for movement across a field to be harvested. The frame 12 carries a cab 20, within which an operator controls operation of the windrower 10, and a rearwardly spaced compartment 22 housing a power source (not shown) such as an internal combustion engine. A harvesting header 24 is supported on the front of the frame 12 in a manner understood by those skilled in the art.

The header 24 may be similar to that disclosed in U.S. Pat. No. 6,158,201 to Pruitt et al. entitled "Rotary Mower Conditioner Having Improved Crop Flow" which is assigned to the assignee of the present invention and incorporated by reference in its entirety herein. The header 24 may be configured as a modular unit and consequently may be disconnected for removal from the frame 12. Accordingly, the frame 12 is not dedicated only to those harvesting operations provided by the header 24, but may carry other modular headers designed to perform different harvesting operations. Similarly, the header 24 may be removed from the frame 12 and installed on other variously constructed mobile frames, such as a pull-type implement. In this respect, it will be appreciated that the principles of the present invention are equally applicable to pull-type harvesting machines and machines dedicated only to mowing and conditioning crop.

As is known in the art, the header 24 has a laterally extending crop cutting assembly 26 in the form of a low profile, rotary style cutter bed located adjacent the front of the header 24 for severing crop from the ground as the windrower 10 moves across a field. However, one skilled in the art will understand that other types of crop cutting assemblies 26, such as sickle style cutter beds may also be used without departing from the scope of the invention.

Figure 2:
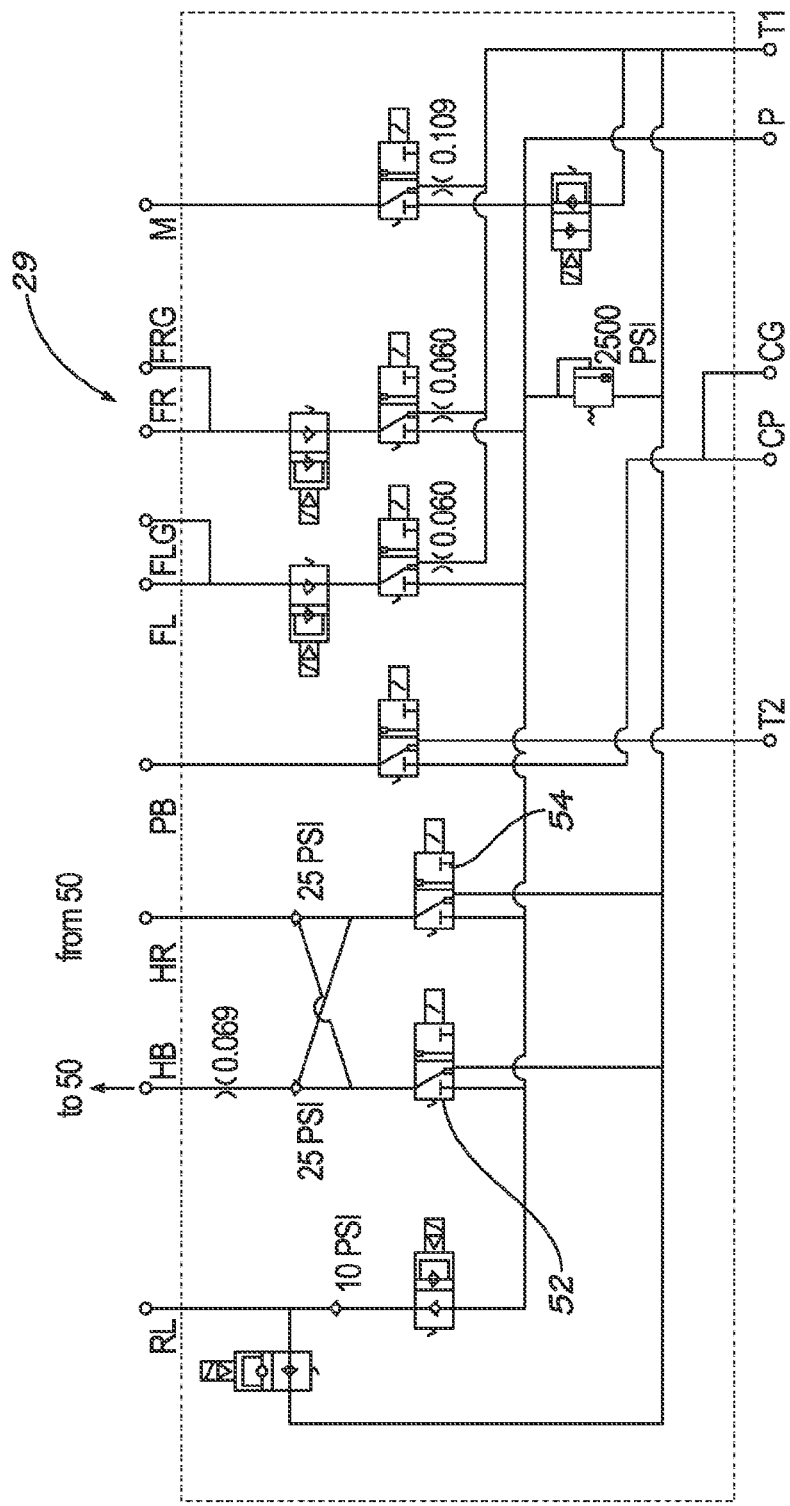
FIG. 2 is a schematic view of a portion of a hydraulic system on the windrower of FIG. 1.

Windrower 10 also typically includes at least one microprocessor based onboard electronics control module 28, usually positioned at a convenient location within cab 20. Electronics control module 28 includes the control logic for operation of the electronics and hydraulics associated with the header 24. A header hydraulic system 29 (shown schematically in FIG. 2) is coupled with the main hydraulics of windrower 10 for various hydraulic functions. During a harvesting operation, windrower 10 moves forward through the field with header 24 lowered to a working height. Windrower 10 includes a conventional lift frame (not shown) which is mounted to vehicle chassis 12 and detachably interconnects vehicle chassis 12 with header 24. A pair of lift cylinders (not shown) coupled between vehicle chassis 12 and lift frame are used to move header 24 to a selected operating or transport height. A mechanical drive extending laterally from lift frame is coupled with driven mechanical components (e.g., cutterbar 26) on header 24 in known manner.

When operating the header 24, it is well known to have the ability to adjust the height of the header above the surface of the ground to select the height at which the crops are cut. Adjustments in the height of the header 24 may be required frequently, particularly when reaching the end of a crop row.

As is known in the art, the electronics control module 28 can operate in a manual mode, a return to cut mode, a float mode and/or a height mode. In the manual mode, electronics control module 28 moves the header 24 up and down in response to operation of a header height switch (not shown). In the height mode, electronics control module 28 maintains header 24 at a selected location relative to the front of the windrower 10. In the float mode, electronics control module 28 maintains header 24 at a selected contact pressure with the ground surface. In the return to cut mode, electronics control module 28 allows the user to raise header 24 (typically at the end of a row in a field) from a predetermined cutting position by toggling header height switch upward and then automatically return the header to the cutting position (typically at the beginning of a row in the field) by toggling header height switch downward. Desirably, the electronics control module 28 provides an output that activates solenoid valves to port hydraulic fluid to lift cylinders to raise and lower the header 24.

As is known in the art, the windrower 10 has a header height position sensor 34 constructed and operable according one of several known means for detecting or sensing a height of the header 24 relative to the forward end of the windrower 10. The header height position sensor 34 is desirably of conventional construction and contains an electrical sensor device, such as a potentiometer or Hall effect device including circuitry which outputs a signal indicative of the height of the header 24 relative the chassis 12. Conventional header height position sensors 34 are known to those skilled in the art, and additional detail for such position sensors need not be included herein.

Figure 3:
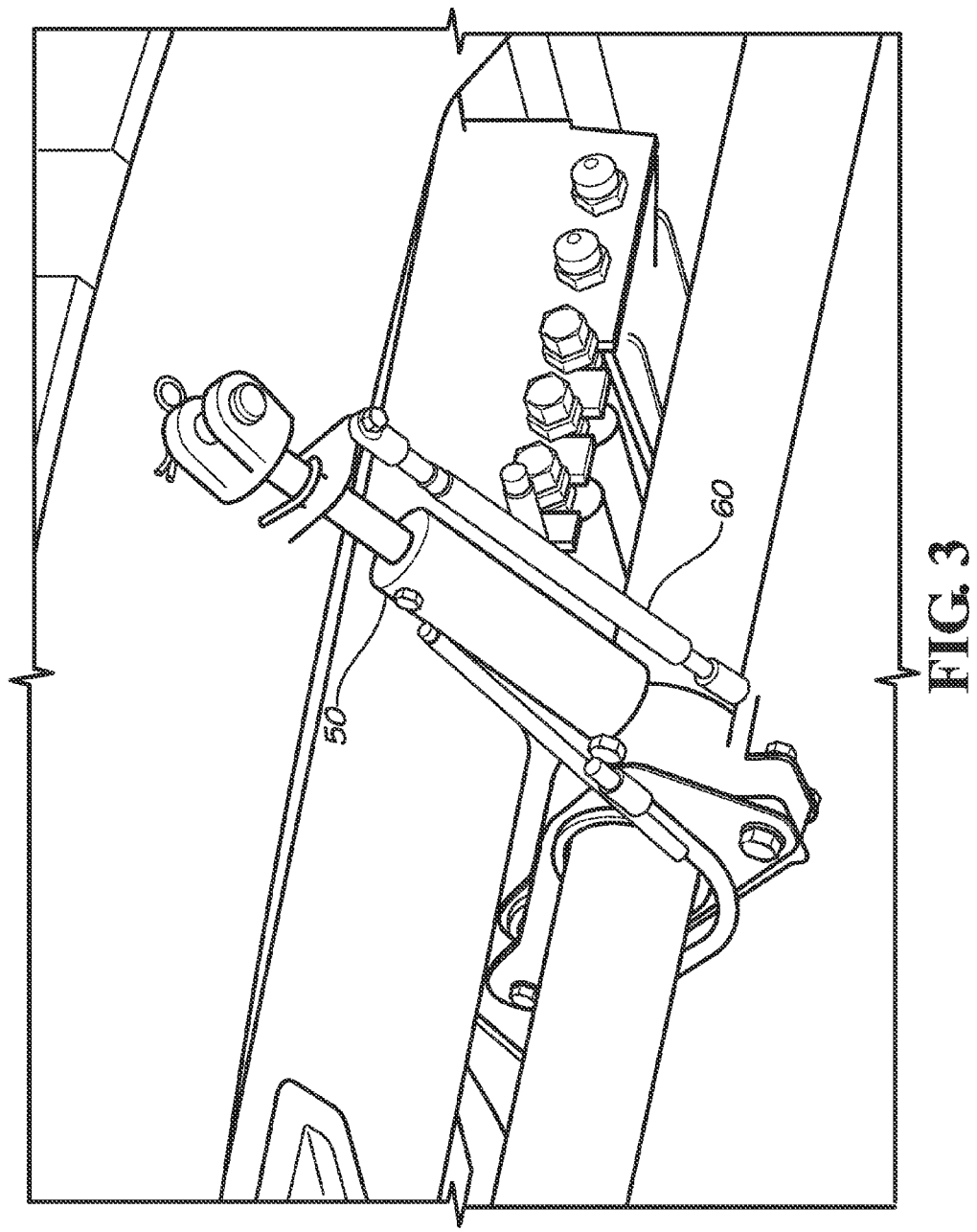
FIG. 3 is an enlarged view of a portion of a header tilt assembly of the windrower of FIG. 1.

Additionally, the fore/aft pitch angle of the header 24 relative the windrower 10 is adjustable to alter the angle of the cutter bed 26 relative the ground surface for optimal cutting performance. As best seen in FIG. 3, at least one hydraulic cylinder 50 is used to adjust the for/aft pitch angle of the header 24 using sound engineering judgment.

Initially, the pitch angle of the header 24 is desirably manually selected by activating solenoid valves 52, 54 (FIG. 2) to provide hydraulic flow to operate the hydraulic cylinder 50. A header pitch sensor 60 measures the fore/aft pitch angle of the header 24. The header pitch sensor 60 is desirably of conventional construction and contains a linear position indicator that measures the position of the hydraulic cylinder 50. However, any known position indicator sensor device, such as a potentiometer or Hall effect device including circuitry which outputs a signal representative of the position of the hydraulic cylinder 50 or pitch angle of the header 24 may be used. Conventional position sensors capable of measuring the pitch angle are known to those skilled in the art, and specific detail for such position sensors need not be included herein. When operating with the header 24 in a tilted forward position, the normal clearance under the cutting bed 26 is reduced when the header 24 is moved to its raised position. This may a problem in crops that produce large, bushy windrows such as canola. For example, the clearance under the cutter bed 26 can vary by approximately four inches (ten centimeters) between having the header 24 rolled forward and rolled backwards.

According to the invention, the electronics control module 28 has a mode that automatically operates the header tilt hydraulic cylinder 50 to return the header 24 to a generally zero-tilt or rolled back condition when the header 24 is raised. For example, when the operator reaches the end of a row and raises the header 24 with a header raise button, the electronics control module 28 generates a signal that operates the solenoid valves 52, 54 in the hydraulic system to have the header tilt hydraulic cylinder 50 return the header 24 to a generally zero-tilt or rolled back position. This maximizes the clearance under the header 24 for turning at the field ends. Upon lowering the header 24 back to the desired cutting height position, the electronics control module 28 automatically extends the header tilt hydraulic cylinder 50 so that the header 24 returns to the selected tilt position it was in at the start of the cycle as measured by the header pitch sensor 60. In one embodiment, the electronics control module 28 stores signal information from the header pitch sensor 60 representative of the selected pitch angle prior to raising the header 24. When the electronics control module 28 receives a signal that the header 24 is in its fully raised position, such as from the header height sensor 34, the electronics control module 28 causes the header 24 to roll back out of its tilted position. When the header 24 is later lowered, the electronics control module 28 causes the hydraulic system 29 to operate the header tilt hydraulic cylinder 50 to position the header 24 back in the selected tilt position as measured by the header pitch sensor 60. This eliminates the need for the operator from having to manipulate an additional switch to adjust the pitch of the header 24 during the cycle and eliminates having to manually return the header 24 to the previous tilt setting.

In another exemplary embodiment, the electronics control module 28 could have pre-set flotation settings for cutting on borders. When the border mode is activated, the header 24 could automatically roll back to a predetermined pitch position to reduce the amount of dirt and rocks that get into the crop. When the border mode is deactivated, the header 24 could return to its original pitch position.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A method for operating a harvesting header mounted on a forward end of a windrower and operable to cut and collect standing crop in a field, the header having a laterally extending crop cutting assembly for severing crop from the ground as the windrower moves across the field, the method comprising:

selecting a fore/aft pitch angle of the header;

measuring the fore/aft pitch angle with a header pitch sensor;

selecting an operating height of the header at which the cutting assembly is configured to cut crop;

raising the header from the operating height to a raised, non-operating height by operator action using a header hydraulic system when reaching the end of a row in the field;

in response to raising the header, automatically generating a pitch angle signal with an electronics control module that causes operation of at least one solenoid valve in the header hydraulic system to move the header to a zero-tilt position;

lowering the header from the raised, non-operating height to the operating height by operator action using the header hydraulic system when reaching a new row in the field; and in response to lowering the header, automatically generating a pitch angle signal with the electronics control module that causes operation of at least one solenoid valve in the header hydraulic system to move the header to back to the selected fore/aft pitch angle as measured by the header pitch sensor.

2. The method of claim 1 wherein selecting the fore/aft pitch angle of the header uses at least one hydraulic tilt cylinder to adjust the pitch angle of the header.

3. The method of claim 1 further comprising storing signal information from the header pitch sensor representative of the selected pitch angle prior to raising the header in the electronics control module.

4. The method of claim 1 wherein the pitch angle signal automatically generated by the electronics control module is generated when the electronics control module receives a signal that the header is in a fully raised position generated by a header height sensor.

\* \* \* \* \*